United States Patent [19]
Hultgren

[11] 3,977,519
[45] Aug. 31, 1976

[54] SLIDE STORAGE TRAY

[76] Inventor: Claes L. Hultgren, 334 Harris Ave., Clarendon Hills, Ill. 60514

[22] Filed: May 9, 1974

[21] Appl. No.: 468,598

[52] U.S. Cl. .............................. 206/216; 206/456
[51] Int. Cl.² ........................................ G03B 23/06
[58] Field of Search ............... 353/9, 21, 107, 112, 353/114, 117, 121, 103, 122, 113, 83, 86; 40/79, 74, 68; 206/73

[56] References Cited
UNITED STATES PATENTS

| | | | |
|---|---|---|---|
| 2,729,375 | 1/1956 | Pace | 220/21 X |
| 3,781,103 | 12/1973 | DiPietro | 353/111 |

FOREIGN PATENTS OR APPLICATIONS

| | | | |
|---|---|---|---|
| 1,027,066 | 3/1958 | Germany | 206/73 |
| 1,207,592 | 10/1970 | United Kingdom | 206/73 |

*Primary Examiner*—Richard E. Aegerter
*Assistant Examiner*—Larry Jones
*Attorney, Agent, or Firm*—Hibben, Noyes & Bicknell, Ltd.

[57] ABSTRACT

Relatively inexpensive slide storage trays are provided for use with a single slide projection tray. The slide storage tray has alignment and indexing means cooperable with the projection tray so that the trays can be temporarily mated for transfer of slides from the slide compartments of one tray to the slide compartments of the other tray while maintaining a predetermined arrangement or sequence of slides relative to the compartments. A pusher device may be utilized to facilitate transfer of slides from certain types of projection trays.

21 Claims, 13 Drawing Figures

U.S. Patent  Aug. 31, 1976  Sheet 1 of 2  3,977,519
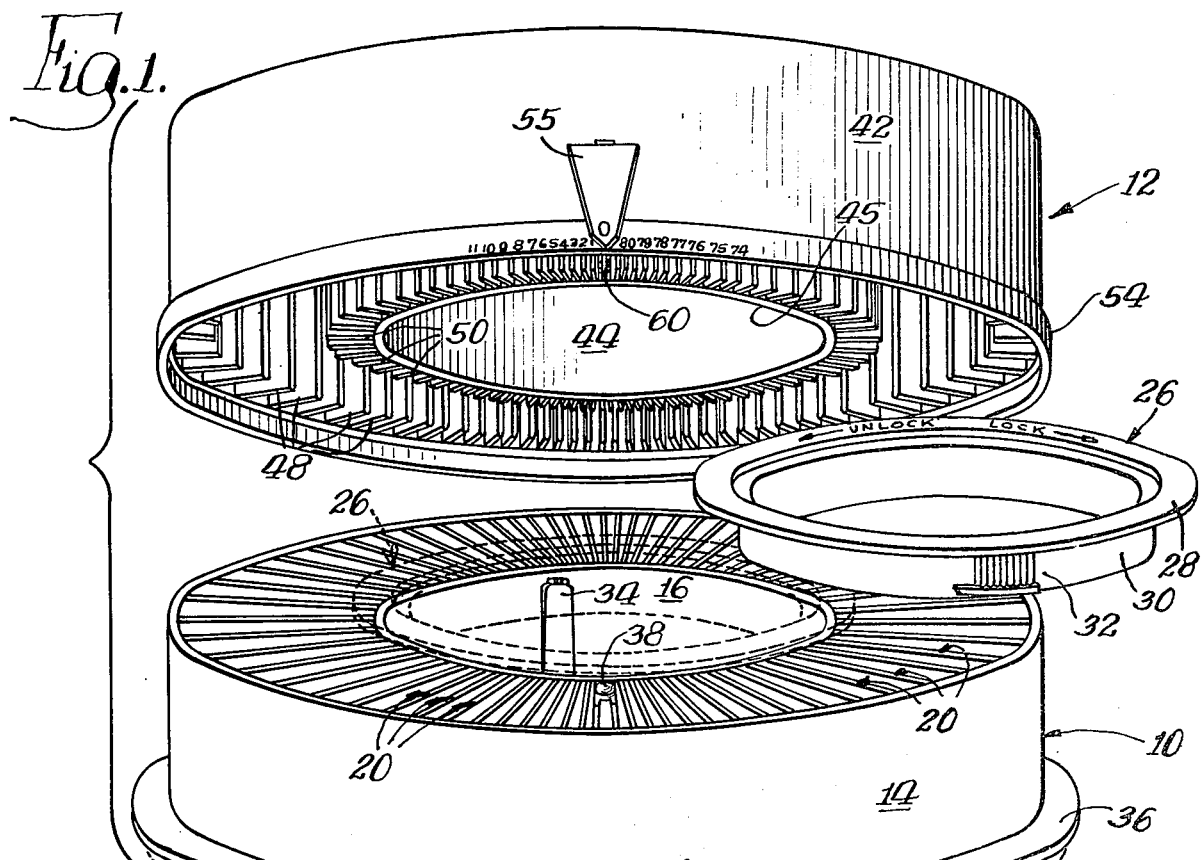
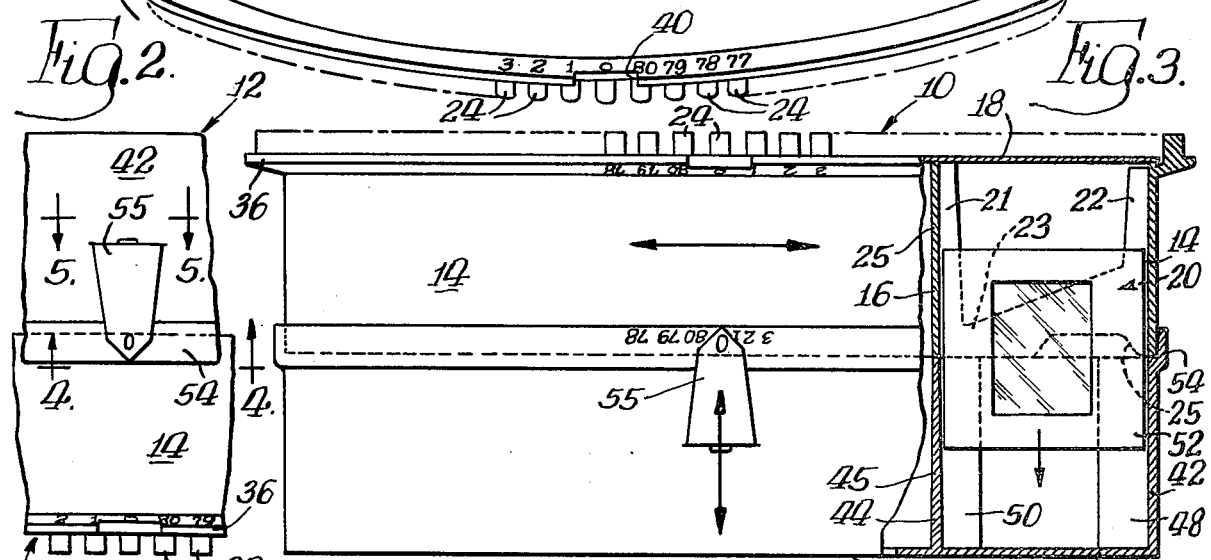
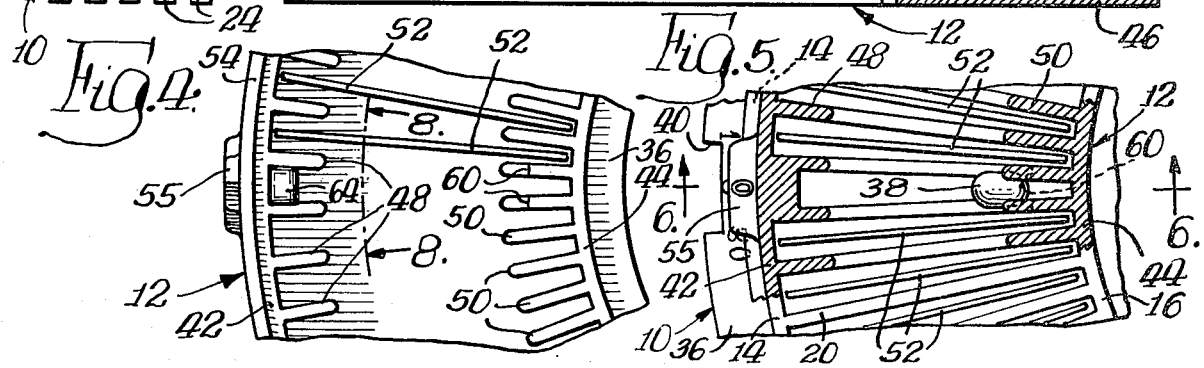

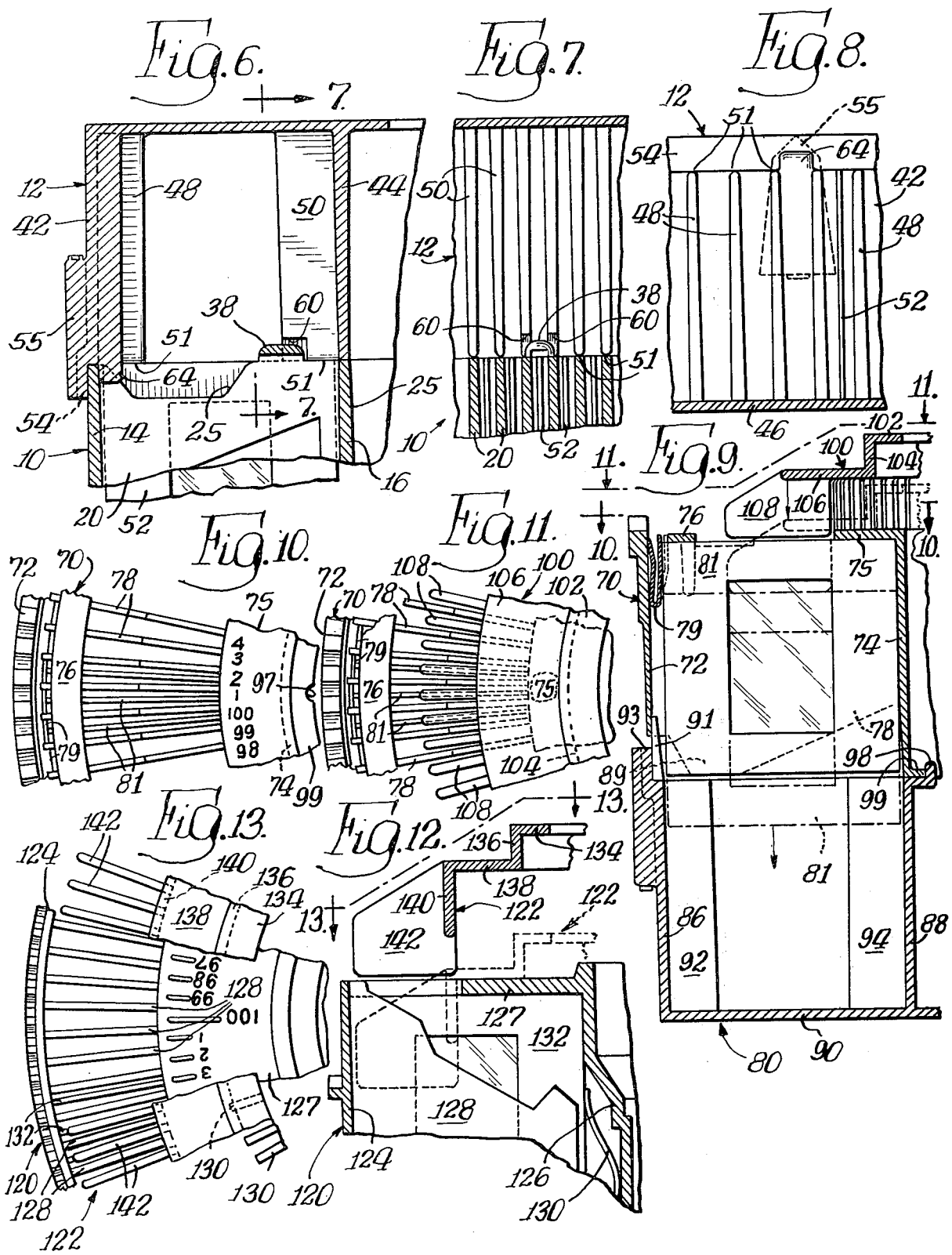

SLIDE STORAGE TRAY

This invention relates generally to photographic slide storage systmes and more particularly to an improved apparatus and method for storing photographic slides before and after showing them in a slide projector.

Slide projectors of the prior art have special slide magazines or projection trays with a plurality of compartments in which slides may be placed. Usually a particular slide projection tray is designed to fit a particular projector, and frequently the tray is equipped with an auxiliary mechanism to facilitate transferring slides from the slide projection tray to the projector and back to the slide projection tray. Heretofore, such slide projection trays have also been used as file trays for storage purposes, the slides being more or less permanently kept in the compartments of the slide projection tray. Consequently, many slide projection trays are normally required to store the many hundreds or thousands of slides a person may accumulate. Such practice is costly since slide projection trays are not economical storage containers. The alternative to storing slides in projection trays is to use a bulk storage container and to transfer the slides manually one-by-one to the projection tray and then back to storage; such practice, however, is tedious and can result in damage to the slides.

The aforementioned disadvantages have been eliminated by the slide storage tray and slide storage method of the present invention. The slide storage tray of the present invention has a configuration, usually circular, complementing that of the slide projector tray with which it is used, and the storage tray has a plurality of slide compartments which can be aligned with similar compartments in the projection tray. The storage tray is provided with aligning and indexing features to facilitate positioning of the storage tray in mutual slide transfer relation with the projection tray. However, the auxiliary mechanisms of certain prior art trays are not required, so that the slide storage tray of the present invention is less expensive to manufacture and to use for slide storage than the slide projection trays heretofore used for both storage and projection purposes. The method of the present invention comprises the steps of aligning the slide storage tray with the slide projection tray, indexing the compartments of the slide storage tray with the corresponding compartments of the slide projection tray, and transferring the slides substantially simultaneously from one of the trays to the other of the trays. Normally, the force of gravity assisted by shaking of the mated trays is sufficient to cause the slides to fall from one tray into the other tray. Certain known slide projection trays have spring means or the like for releasably holding the slides in the trays. In such case the present invention may also utilize a pusher device for positively transferring the slides from such projection trays.

The primary object of the present invention is to provide an economical and relatively easy way to store slides before and after showing the slides in a projector.

Another object of the invention is to provide a slide storage tray and method which can be compatibly used with existing slide projection trays.

Yet another object of the invention is to provide an improved system of gravitational or positive transfer of a plurality of slides substantially simultaneously between a slide storage tray and a slide projection tray.

These and other objects of the present invention will become apparent from the following description in conjunction with the accompanying drawings, wherein:

FIG. 1 is an exploded perspective view of a preferred embodiment of the slide storage tray of the present invention (shown in the upper half) in position to be mated with a conventional slide projection tray (shown in the lower half);

FIG. 2 is a fragmentary elevational view of portions of the slide projection and storage trays shown in FIG. 1, but showing the trays in mated or assembled relation;

FIG. 3 is an elevational view of the slide projection and storage trays of FIG. 1 in mated and inverted position, portions of the structure being broken away and shown in section to reveal interior features of construction;

FIG. 4 is a fragmentary bottom plan view of the slide storage tray taken in the direction of the arrows at line 4—4 of FIG. 2;

FIG. 5 is a fragmentary sectional view taken on the line 5—5 of FIG. 2;

FIG. 6 is a fragmentary sectional view taken on the line 6—6 of FIG. 5;

FIG. 7 is a fragmentary sectional view taken on the line 7—7 of FIG. 6;

FIG. 8 is a fragmentary sectional view taken on the line 8—8 of FIG. 4;

FIG. 9 is a fragmentary sectional view of the slide storage tray of the present invention in mated relation with a different type of slide projection tray and showing the use of a pusher device for effecting positive transfer of slides from the projection tray to the storage tray;

FIG. 10 is a fragmentary top plan view of the slide projection tray taken in the direction of the arrows at line 10—10 of FIG. 9;

FIG. 11 is a fragmentary top plan view taken in the direction of the arrows at line 11—11 of FIG. 9;

FIG. 12 is a fragmentary sectional view of still another type of slide projection tray and showing the use of the pusher device to effect positive transfer of slides to the storage tray; and FIG. 13 is a fragmentary top plan view taken in the direction of the arrows at line 13—13 of FIG. 12.

FIG. 1 illustrates a conventional slide projection tray 10 which is used in conjunction with a slide projector (not shown) to display slides. A slide storage file or tray 12 comprising a preferred embodiment of the present invention cooperates with the tray 10 and is used to store the slides. The slide projection tray 10, in this instance, is a type manufactured by Eastman Kodak Company for use with their Carousel slide projectors. The slide projection tray 10 includes an outer cylindrical wall or shell 14, an inner cylindrical wall or shell 16, and an annular disc (FIG. 3) closing one end of the space between the outer wall 14 and the inner wall 16. The disc 18 provides a bottom support for the slides. The other end or side of the tray 10 is open for insertion of slides. The slide projection tray 10 has a plurality (in this instance, eighty-one) of radially disposed slide compartments or slots formed by radial partitions or separators 20 which extend between the outer wall 14 and the inner wall 16. As shown in the upper half of FIG. 3 (where the tray 10 is shown in inverted position), the partitions 20 are generally "U" shaped, each partition 20 having an inner portion 21 secured to the wall 16, an outer portion 22 secured to the wall 14, and a connecting or joining portion 23. The free edges of the connecting portions 23 at the open side of the tray 10 have notches or cut-out portions 25 to facilitate manual grasping of slides in the compartments.

A plurality of indexing pins 24 extend from a rim portion 36 at the outer wall 14 and are adapted to be moved by a slide tray drive mechanism on the slide projector for rotating the tray in increments. In addition, the projector and slide projection tray 10 have a slide transfer mechanism (not shown) for transferring slides one-by-one from the slide projection tray to the slide projector and back. Since such mechanism forms no part of the present invention, further description is unnecessary, but reference is made to Robinson U.S. Pat. No. 3,276,156 for additional details of the tray 10.

As shown in FIG. 1, indicia in the form of 81 numbers, "0" to "80", are located on the rim 36 and identify the eighty-one slide compartments of the tray 10. In this particular type of tray it is necessary that one of the compartments, in this instance, the 0 compartment, remain empty at all times for the above-mentioned slide transferring mechanism to function. To prevent insertion of a slide, a small raised bridge or protuberance 38 is provided between the two partitions 20 which define the 0 compartment, the protuberance being located in this instance at the inner edge of the compartment adjacent the wall 16. Also, to facilitate proper mounting of the tray 10 on the slide projector, the rim 36 is notched adjacent the 0 compartment, as indicated by the reference numeral 40.

To hold the slides in the slide projection tray 10, a detachable locking ring 26 is provided. The ring 26 has an annular flange portion 28 and a depending cylindrical portion 30. The locking ring 26 may be inserted in the center opening of the tray 10 defined by the wall 16, as shown in dashed lines in FIG. 1, and rotated clockwise so that a plurality of stepped ramps 32 on the cylindrical portion 30 of the ring 26 will twist-lock with cooperating lugs 34 formed on the inner surface of wall 16 to hold the ring 26 in place on the slide projection tray 10. The flange portion 28 of the locking ring 26 extends radially outwardly to overlie and prevent removal of slides from the compartments of the tray 10, but the locking ring is removable by reverse or counterclockwise rotation to disengage the ramps 32 from the lugs 34.

As shown in FIGS. 1 and 3, the slide storage file or tray 12 of the present invention comprises a tray body having an outer cylindrical wall 42, an inner cylindrical wall 44 defining a central tray opening 45, and an annular bottom wall 46 joining the outer cylindrical wall 42 and the inner cylindrical wall 44. The annular wall 46 closes one end of the space between the walls 42 and 44, the other end being open to permit the transfer of slides. The storage tray 12 has the same number and location of slide storage compartments as the slide projection tray 10 with which the slide storage tray is to be used. Thus, in this instance there are also eighty-one compartments in the slide storage tray 12. As can be seen in FIG. 4, the compartments are preferably formed by a plurality of short radial partitions or ribs 48 extending inwardly from the outer cylindrical wall 42 and a plurality of short radial partitions or ribs 50 extending outwardly from the inner cylindrical wall 44 in alignment with the partitions 48. Slides 52 are shown in some of these compartments in FIGS. 4 and 5. This construction has the advantage of using less material, such as plastic material, to form the tray 12, but full partitions between the walls 42 and 44 may also be used. As shown in FIG. 8, the free edges of the partitions 48 and 50 at the open end of the tray are "radiused" or rounded at the corners, as indicated by the reference numeral 51, so as to reduce the tendency of the slides to "hang up" or get caught on the edges of the partitions 48 and 50 during transfer of slides to the tray 12. As an alternative construction, which would conserve plastic material, the partitions or ribs 48 and 50 instead of having a uniform thickness as shown in FIG. 4 could have relatively thin web portions extending from the walls 42 and 44 with the outermost free edges having an enlarged bead or cylindrical configuration.

The body of the slide storage tray 12 of the present invention is provided with means for radially aligning and mating the tray 12 and its compartments with the slide projection tray 10 and its compartments. While the aligning means can take various forms, such as a plurality of tabs or a flange on thee inner cylindrical wall 44 of the slide storage tray 12 cooperable with the inner cylindrical wall 16 of the slide projection tray, in this instance the aligning means comprises an outwardly offset depending circumferential flange or skirt 54 formed, as shown in FIG. 1, on the bottom of the outer cylindrical wall 42 and at the open side of the tray 12. As best seen in FIGS. 3 and 6, the skirt 54 is offset and dimensioned to encircle and receive in close-fitting telescopic relation the edge of the outer cylindrical wall 14 of the slide projection tray 10 so that the open sides of the two trays are juxtaposed to permit alignment of their respective slide compartments. As mentioned above, although a continuous circumferential flange 54 is illustrated, a similar result can be obtained by using a plurality of spaced tabs or flanges.

Also, the slide storage tray 12 is provided with indexing means to insure that the compartments of the storage tray 12 are accurately aligned with the corresponding compartments of the slide projection tray 10 so as to permit slides to be freely transferred therebetween. As seen in FIG. 1, the skirt 54 of the storage tray 12 is provided with indicia identifying the slide compartments by the numbers 0 through 80 just as in the case of the projection tray 10. As will readily be understood, however, the indicia can be located elsewhere than on the skirt portion 54. Moreover, if desired, only the 0 indicium may be carried on the storage tray. An indicator or pointer 55 is prominently disposed on the outer surface of the wall 42 to designate the 0 compartment of the tray 12. In this instance, the indexing means includes a notch or groove 60 formed in the two partitions 50 which define the 0 compartment of the tray 12. The groove 60 is located in this instance at the inner edge of the compartment adjacent the wall 44 and is adapted to accommodate or receive the protuberance 38 of the slide projection tray 10. The principal indexing means is provided by a pin 64 located between the two partitions 48 forming the 0 compartment of the slide storage tray 12. As best seen in FIG. 6, the pin 64 is at the opposite edge of the 0 compartment from the groove 60. The pin 64 is of sufficient length that it extends beyond the edge of the wall 42 in spaced relation from the skirt 54 and projects in close fitting relation into the 0 compartment of the slide projection tray 10. The pin 64 on the slide storage tray 12 is dimensioned to fill enough of the 0 compartment to prevent the user from inadvertently inserting a slide in this compartment.

The method of slide storage and the use of the slide storage tray 12 of the present invention will now be described. For this purpose, assume that the projectionist has just removed the slide projection tray 10 filled with slides from the projector after having shown the slides. The slide projection tray 10 may be set down on a level surface, such as a projection table. The locking ring 26 is removed from the slide projection tray 10, as shown in full lines in FIG. 1. An empty slide storage tray 12 is then inverted and placed in mating relation on top of the full slide projection tray 10 so that the openings of the slide compartments of the respective trays are juxtaposed. As is shown in FIGS. 2 and 6, the skirt 54 of the slide storage tray 12 embraces and encircles the upper portion of the outer circumferential wall 14 of the slide projection tray 10. At the same time, by utilizing the indicator 55 and the indicia on the rim 36, the slide projection tray 10 and slide storage tray 12 are rotatably indexed so that the 0 compartment of tray 12 is directly over the 0 compartment of tray 10. When in this indexed position, the protuberance 38 on the slide projection tray 10 is received within the groove 60 in the slide storage tray 12 and the pin 64 of the slide tray 12 fits snugly in the 0 compartment or slot of the slide projection tray 10. This mutual indexing coaction is best seen in FIG. 6.

The slide projection tray 10 and slide storage tray 12 may now be inverted to the position shown in FIG. 3 so that the empty tray is below the full tray. To assist gravity in transferring the slides 52 between the mated trays, they may be shaken a few times. As previously mentioned, the rounded corner edges 51 on the partitions 48 and 50 will ordinarily guide and facilitate the movement of the slides into the compartments of the tray 12, but in the event there is any tendency for the slides to "hang up," the shaking of the mated trays will be sufficient to correct this condition. The tray 12 may advantageously be made of transparent plastic material to permit the user to observe whether or not the slides have been properly transferred. The slide projection tray 10 and the slide storage tray 12 can now be separated. The full slide storage tray 12 may be stored, and the empty slide projection tray 10 is ready to be refilled. A suitable dust cover may be placed over or around the full storage tray to protect the slides.

A second slide storage tray 12 loaded with other slides can be taken from storage and placed in the position shown in FIG. 3. The empty slide projection tray 10 is then placed on top of the second slide storage tray 12 and properly aligned and indexed as described above. The second slide storage tray 12 and the projection tray 10 are then inverted to the position shown in FIG. 2 so that the slides are transferred from the second slide storage tray 12 into the slide projection tray 10. The empty second slide storage tray 12 may be set aside. The locking ring 26 is installed on the slide projection tray 10, as seen in broken lines in FIG. 1, and that the tray is then installed in the projector to show the slides. Thus, slides can be stored in a plurality of less expensive slide storage trays 12 while only a single slide projection tray is required, usually the one supplied with the slide projector.

In certain slide projection trays, the slides are releasably retained by various means, such as leaf springs, so that the slides will not readily fall by gravity from the slide projection tray merely upon inversion. In some of these trays the construction is such as to permit the projectionist to use his hand or finger to push the slides sufficiently to clear the retention means so that they may fall from the slide projection tray into the slide storage tray. In the reverse operation, the slides may gravitate only partially into the slide projection tray, but again the projectionist may complete the transfer of the slides into the slide projection tray by manually forcing the slides into engaged relation with the slide retention means.

In certain other slide projection trays with slide retention means, there is insufficient space to permit the projectionist to manually force the slides from the slide projection tray into the slide storage tray. Such a slide projection tray 70 (having one hundred slide compartments) is shown in FIGS. 9–11. The tray 70 comprises an outer cylindrical wall 72 and an inner cylindrical wall 74. As shown in FIG. 9, an annular ring or flange portion 75 extends radially outwardly from the inner cylindrical wall 74 and another annular ring or flange portion 76 is disposed adjacent the wall 72. The ring 76 is affixed to a plurality of radially disposed partitions 78 which extend between the walls 72 and 74 to form the one hundred slide compartments of the tray. The annular rings 75 and 76 provide the bottom support for the slides 81 in the compartments. As shown in FIG. 9, a plurality of small "U" shaped leaf springs 79 are located between the outer cylindrical wall 72 and the outer annular ring 76. The leaf springs 79 normally extend inwardly of the slide compartments, as indicated in broken lines in FIG. 9, but when a slide 81 is inserted, the edge of the slide engages and resiliently displaces the retaining spring 79, as shown in solid lines, so that should the tray 70 be raised vertically or inverted, the slides will not fall out.

The slide projection tray 70 is used in conjunction with a compatible slide storage tray 80 of the present invention. The slide storage tray 80 comprises an outer cylindrical wall 86 and an inner cylindrical wall 88 which are closed at one end by an annular wall 90. Compartments, one hundred in number, are formed in the slide storage tray 80 by radial partitions 92 extending inwardly from the outer cylindrical wall 86 and radial partitions 94 extending outwardly from the inner cylindrical wall 88. As seen in FIG. 9, the partitions 78 of the tray 70 have an irregular edge configuration at the open side of the tray, including projecting portions 89 which extend axially beyond the edge of the wall 72. The aligning and indexing means includes an outer projection or pin 91 extending axially from the outer wall 86 of the tray 80 and disposed inwardly of a peripheral skirt 93 so as to fit into the 1 compartment of the tray 70 in close-fitting relation with the inner surface of the wall 72. The alignment and indexing means further comprises an inner pin or projection 98 which extends axially from the wall 88 of tray 80 in radial alignment with the outer pin or projection and is received in engaged relation in a semi-circular notch or recess 97 (FIG. 10) in a flange portion 99 extending inwardly from the wall 74 of tray 70. Thus, the coaction of the pins 91 and 98 on the tray 80 with cooperating structure on the tray 70 insures that the same numbered slide compartments of the two trays are juxtaposed.

In order to transfer the slides substantially simultaneously from the slide projection tray 70 to the slide storage tray 80, slide transfer means in the form of a pusher 100 is provided. The pusher 100 may be made of plastic material and is in the form of a body having an upper annular portion 102 joined to an intermediate cylindrical portion 104 which in turn carries a lower annular portion 106. A plurality of radially extending blades or fins 108 depend perpendicularly from the bottom of the lower annular portion 106. The fins 108 are dimensioned so as to fit between the annular rings 75 and 76 on the slide projection tray 70 and extend into the slide compartments. The fins 108 are of sufficient length or depth that when the pusher 100 is in the depressed position shown in the broken lines of FIG. 9, the fins 108 force the slides 81 past the springs 79 so that the slides will fall by gravity into the slide storage tray 80.

The transfer of slides from the slide storage tray 80 to the slide projection tray 70 is accomplished in the reverse manner, as described above, with the final seating of the slides in retained relation with the springs 79 being completed manually by the projectionist.

Another type of slide projection tray 120 and a cooperating pusher 122 are shown in FIGS. 12 and 13. It is understood that the slide projection tray 120 is to be used in conjunction with a suitable slide storage tray (not shown) constructed in accordance with the present invention so as to be compatible with the slide projection tray 120 and having suitable alignment and indexing means.

As can be seen in FIG. 12, the slide projection tray 120 has an outer cylindrical wall 124 and an inner cylindrical wall 126, the slide compartments being formed by radial walls 128 extending between the inner and outer cylindrical walls 124 and 126. A bottom support for the slides in their compartments is provided by a flange portion 127 extending outwardly from the wall 126. A retaining means in the form of a leaf spring 130 is located in each compartment on the inner cylindrical wall 126 and can engage the edge of a slide 132 to retain it in position. The pusher 122 comprises an upper annular portion 134 joined to a first cylindrical portion 136 which in turn joins a second annular portion 138 which in turn joins a second cylindrical portion 140. The portion 140 has radially extending pusher elements or fins 142 spaced to fit into the compartments of the slide projection tray 120 between the wall 124 and the flange 127. As the pusher 122 is moved from its full line position in FIG. 12 to its dashed line position in FIG. 12, it will cause the slides 132 to be forced past the leaf springs 130 so that the slides may fall by gravity into the slide storage tray (not shown) beneath the slide projection tray 120.

Although the invention has been described with particular reference to certain specific structural embodiments, it should be understood that various modifications and equivalents may be resorted to without departing from the scope of the invention as defined in the appended claims.

I claim:

1. A slide storage tray adapted for use with a complementary slide projection tray of the type having a plurality of slide compartments with openings at one side of the slide projection tray for the insertion and removal of slides, said slide storage tray comprising:

a tray body having cooperating walls and partition means defining a plurality of slide storage compartments with openings at one side of said tray body for the insertion and removal of slides; and alignment and indexing means at only one side of said tray body adjacent said slide storage compartment openings;

said alignment and indexing means being adapted to engage in interfitting and cooperating relation with coacting means at only said one side of a complementary slide projection tray adjacent the slide compartment openings of the latter when the trays are fitted together in mating relation with the openings of their respective compartments juxtaposed in only a single relative position of the trays;

whereby alignment and orientation of said slide storage compartments of said slide storage tray with the slide compartments of the slide projection tray is effected in only a single relative position of the trays such that predetermined slide compartments of the slide projection tray are in slide transfer relation with only corresponding predetermined slide storage compartments of said slide storage tray.

2. The slide storage tray of claim 1, wherein said alignment and indexing means comprises at least one projection extending from said tray body and adapted to interfit with a complementary recess on the slide projection tray.

3. The slide storage tray of claim 1, wherein said alignment and indexing means comprises a projection extending from said tray body and adapted to extend into one of the slide compartments of the slide projection tray.

4. The slide storage tray of claim 1, wherein said tray body is provided with indicia identifying at least one of the slide storage compartments of the slide storage tray, and said alignment and indexing means are positioned on said tray body so that each identified slide storage compartment of said slide storage tray is adapted to be juxtaposed in slide transfer relation only with a corresponding slide compartment of the slide projection tray.

5. The slide storage tray of claim 1, wherein said tray body is circular and comprises inner and outer cylindrical walls with radial partition means extending therefrom and defining a plurality of circumferentially spaced slide storage compartments, and said alignment and indexing means includes peripheral flange means extending from said outer cylindrical wall and adapted to telescopically receive the outer cylindrical wall of a complementary circular slide projection tray when the trays are juxtaposed.

6. The slide storage tray of claim 5, wherein said alignment and indexing means further comprises a projection extending from a predetermined slide storage compartment of said tray body and being adapted to be received in a corresponding slide compartment of the slide projection tray.

7. The slide storage tray of claim 6, wherein said alignment and indexing means further comprises a recess in said tray body at said predetermined slide storage compartment adapted to receive a coacting protuberance on the slide projection tray.

8. The slide storage tray of claim 5, wherein the corner edges of said partition means at said openings are rounded to facilitate passage of slides through said openings into said slide storage compartments.

9. The slide storage tray of claim 5, wherein said partition means comprises a plurality of ribs extending inwardly from said outer cylindrical wall and a plurality of ribs extending outwardly from said inner cylindrical wall in alignment with said first-named ribs.

10. The slide storage tray of claim 1, wherein said alignment and indexing means comprises (A) peripheral flange means extending from said one side of said tray body and adapted to cooperate with the slide projection tray for aligning the trays and (B) a projection extending from said tray body and adapted to be received in a recess in the slide projection tray for indexing the respective slide compartments of the trays in only a single predetermined sequence.

11. In combination, a slide projection tray comprising a projection tray body having cooperating wall and partition means defining a plurality of slide compartments with openings at one side of said projection tray body for the insertion and removal of slides, a slide storage tray comprising a storage tray body having the same general configuration as said projection tray body and having cooperating wall and partition means defining a plurality of slide compartments with openings at one side of said storage tray body for the insertion and removal of slides, said slide projection tray and said slide storage tray being adapted to be positioned temporarily in mated relation with the respective slide compartment openings juxtaposed, and alignment and indexing means comprising structure at only said one side of said storage tray body adapted to interfit and cooperate with coacting structure at only said one side of said projection tray body when said trays are in mated relation in only a single relative position of said trays so that predetermined slide compartments of said slide projection tray are in slide transfer relation with only predetermined slide compartments of said slide storage tray.

12. The combination of claim 11, wherein said projection tray body has resilient retaining means for releasably retaining slides in the slide compartments thereof and pusher means is provided for effecting positive transfer of slides from said slide projection tray to said slide storage tray, said pusher means comprising a body portion and a plurality of fins adapted to be pushed into the slide compartments of said slide projection tray opposite said openings for engaging and displacing slides from said retaining means.

13. The combination of claim 10, wherein each of said trays has a circular configuration with a plurality of radially disposed and circumferentially spaced slide compartments, and said pusher means comprises an annular body portion with a plurality of radially extending and circumferentially spaced fins.

14. The combination of claim 11, wherein said alignment and indexing means comprises at least one projection extending from said storage tray body and adapted to interfit with a complementary recess on said slide projection tray.

15. The combination of claim 11, wherein said alignment and indexing means comprises a projection extending from said storage tray body and adapted to extend into one of the slide compartments of said slide projection tray.

16. The combination of claim 11, wherein said storage tray body is provided with indicia identifying at least one of the slide storage compartments of said slide storage tray, and said alignment and indexing means are positioned on said tray body so that each identified slide storage compartment of said slide storage tray is adapted to be juxtaposed in slide transfer relation only with a corresponding slide compartment of said slide projection tray.

17. The combination of claim 11, wherein each of said tray bodies is circular and comprises inner and outer cylindrical walls with radial partition means extending therefrom and defining a plurality of circumferentially spaced slide compartments, and said alignment and indexing means includes peripheral flange means extending from the outer cylindrical wall of said storage tray body and adapted to telescopically receive the outer cylindrical wall of said projection tray body when the trays are juxtaposed.

18. The combination of claim 17, wherein said alignment and indexing means further comprises a projection extending from a predetermined slide storage compartment of said storage tray body and being adapted to be received in a corresponding slide compartment of said slide projection tray.

19. The combination of claim 18, wherein said alignment and indexing means further comprises a recess in said storage tray body at said predetermined slide storage compartment adapted to receive a coacting protuberance on said slide projection tray.

20. The combination of claim 17, wherein the corner edges of said partition means of said storage tray body at said openings are rounded to facilitate passage of slides through said openings into said slide storage compartments.

21. The combination of claim 17, wherein said partition means of said storage tray body comprises a plurality of ribs extending inwardly from said outer cylindrical wall and a plurality of ribs extending outwardly from said inner cylindrical wall in alignment with said first-named ribs.

* * * * *